Dec. 6, 1927.

W. H. CHAPMAN

ANTIFRICTION BEARING

Filed May 9, 1924

1,651,807

Inventor:
William H. Chapman,
by
his Attorney.

Patented Dec. 6, 1927.

1,651,807

UNITED STATES PATENT OFFICE.

WILLIAM H. CHAPMAN, OF MONTCLAIR, NEW JERSEY, ASSIGNOR TO GENERAL MOTORS CORPORATION, OF DETROIT, MICHIGAN, A CORPORATION OF DELAWARE.

ANTIFRICTION BEARING.

Application filed May 9, 1924. Serial No. 712,029.

This invention relates to antifriction bearings and is herein shown as embodied in a bearing having cylindrical rollers with a retaining cage therefor.

It has heretofore been proposed to make a cage for rollers by riveting, or otherwise securing, a series of roller guiding tie-bars to a pair of end rings. The many individual joints in this construction are a source of expense as well as weakness and the tie bars occupy considerable circumferential space which decreases the roller capacity. Another form of cage is made by striking outwardly a series of flaps from a sleeve, the flaps being bent to conform to the rollers to guide them. Such flaps are subject to displacement and wear due to the pressure and attrition of the rollers and the cage is weakened by the material struck out for the flaps. This kind of a cage also has its roller and load capacity decreased by the circumferential space required for the roller guiding flaps.

It is an object of the invention, therefore, to provide an improved cage having no tie-bar joints. Another object is to provide a cage which will hold more rollers and have stronger cross connections. Another object is to provide improved roller guiding means which will also retain the rollers in the cage. Still another object is to provide a cage with unobstructed passages from one side to the other to facilitate cleaning and oiling. Yet another object is to produce a cage that is cheap to construct and light and strong withal, and in which the rollers can be conveniently assembled and handled as a unit.

To these ends and also to improve generally upon devices of the character indicated my invention consists in the various matters hereinafter described and claimed.

Referring to the drawings, Figure 1 is a front elevation partly in section on the line 1—1 of Figure 2.

Figure 1:
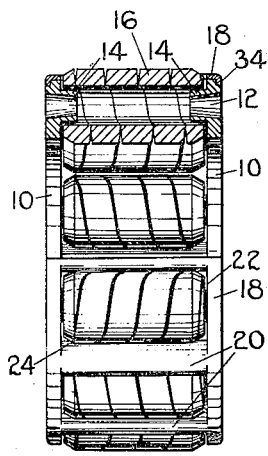
Figure 2:
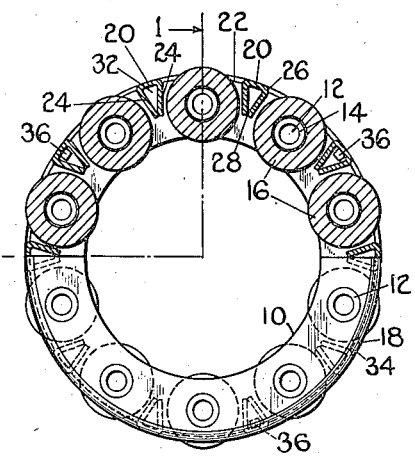
Figure 2 is a side elevation and half section.
Figure 3:
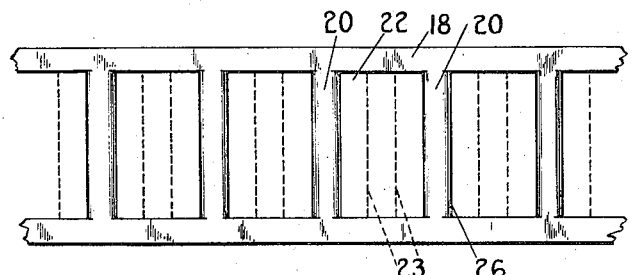
Figure 3 is a plan view of a portion of the band or sleeve developed.

The numeral 10 indicates opposed end rings, each having a series of tapered openings 12 formed therein in the operation of punching out hollow sleeve-like projections or cylindrical trunnions 14. The trunnions are hardened and are arranged in opposite series, in axial alignment with hollow rollers 16, here shown as of the helically wound type which are made on an arbor and therefore adapted to rotate on trunnions. By thus rotatably supporting and guiding the rollers on hollow trunnions, if the hollow trunnions are also made open from end to end, unobstructed passages are formed, extending from one side of the cage to the other so that the bearing is easily cleaned before using, by forcing liquid through it, and oil is conveniently admitted when the bearing is installed. The hollow trunnions are light and strong; they are pressed out of the material of the end rings and are externally cylindrical to enter the end portions of the rollers. Surrounding and uniting the end rings is a circular band or sleeve 18 having a series of bridge pieces 20 alternating with roller receiving openings 22. As shown in the developement of Figure 3, in the formation of the openings, the band or sleeve is cut out at intervals between the sets of dotted lines 23, 23 and flaps are sheared and bent from the material at the sides of the opening, thus forming opposite side wings 24 which brace the bridge pieces.

Figure 4:
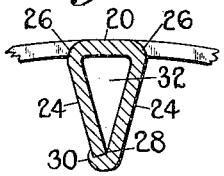
Figure 4 is a detail view of a modification.

The side wings 24 are bent inwardly as at 26 and preferably meet at acute angles as at 28, thus forming closed pockets 32 between adjacent rollers. These pockets may be filled with a supply of lubricant if desired. As shown in Figure 4 one of the side wings 24 may be cut longer and bent and folded over the other one as indicated at 30 to secure the parts more firmly together. The edges of the band 18 are spun inwardly as at 34 into annular recesses formed in the end rings thereby holding said end rings firmly against the shoulders formed by the ends of the side wings 24. One or more lugs 36, punched up or extruded from each end ring, enter the open ends of the pockets 32 and thus locate the end rings and trunnions exactly opposite one another. A slight clearance is provided between the hollow trunnions and the hollow rollers so that the cage can float on the rollers without coming into contact with the inner or outer races.

It will be noted that, by supporting the rollers on the trunnions, the side wings 24 of the bridge pieces can be brought more closely together, thus leaving more circumference space for rollers. In use, the side wings are entirely out of contact with the rollers. This form of cage has a certain springiness which enables it to regain its normal form should one end be forced a little ahead of the other whereas, in the case of a cage having riveted tie bars, the joints are weakened and there is no such tendency to recover shape after a torsional displacement of the ends of the cage.

Although the invention has been described by reference to a specific form, it should be understood that, in its broader aspects, it is not limited to the form selected for illustrative purposes.

I claim:

1. In a roller bearing, a cage comprising a pair of end rings having opposite sets of hardened hollow cylindrical trunnions extending towards each other in axial alignment, rollers journalled on and guided at their ends by the trunnions, a band surrounding and uniting the end rings and having a series of roller receiving openings alternating with bridge pieces, the rollers being guided and supported solely by the trunnions and kept out of contact with the bridge pieces by the trunnions, leaving the bridge pieces free to act as spacers for the end rings without displacement or wear by the rollers; substantially as described.

2. In a roller bearing, a series of rollers, a pair of spaced end rings having trunnions to support and guide the rollers, and a band surrounding and uniting the end rings, said band having a series of roller receiving openings and a plurality of bridge pieces, and said bridge pieces having pairs of side wings in contact with each other at their ends, the rollers being guided and supported solely by the trunnions and held from contact with the side wings, and one of the side wings of a pair being folded over the other side wing to secure the two together; substantially as described.

3. In a roller bearing, a cage comprising a pair of end rings having oppposite sets of hollow sleeve-like trunnions projecting towards each, bridge pieces rigidly spacing the ends rings, hollow spiral rollers journalled on and guided by the trunnions without contact with the bridge pieces, the openings in the hollow rollers and the sleeve-like trunnions being in alignment to leave unobstructed passages from one side of the cage to the other; substantially as described.

In testimony whereof I hereunto affix my signature.

WILLIAM H. CHAPMAN.